US006536533B2

(12) United States Patent
Reilly

(10) Patent No.: US 6,536,533 B2
(45) Date of Patent: Mar. 25, 2003

(54) LOW PRESSURE ACTUATOR FOR DRY SPRINKLER SYSTEM

(75) Inventor: William Joseph Reilly, Langhorne, PA (US)

(73) Assignee: Victaulic Company of America, Easton, PA (US)

( * ) Notice: Subject to any disclaimer, the term of this patent is extended or adjusted under 35 U.S.C. 154(b) by 23 days.

(21) Appl. No.: 09/810,631

(22) Filed: Mar. 16, 2001

(65) Prior Publication Data

US 2002/0003042 A1 Jan. 10, 2002

Related U.S. Application Data

(63) Continuation-in-part of application No. 09/535,599, filed on Mar. 27, 2000, now Pat. No. 6,293,348.

(51) Int. Cl.[7] .......................... F16K 31/12; F16K 21/04; A62C 35/00; A62C 37/36

(52) U.S. Cl. ............................. 169/16; 169/17; 169/18; 169/42; 251/28; 251/30.05

(58) Field of Search .............................. 169/16, 17, 18, 169/20, 19, 42, 9, 22; 239/533.1, 569, 570, 572; 251/28, 30.05, 30.02

(56) References Cited

U.S. PATENT DOCUMENTS

| | | | | |
|---|---|---|---|---|
| 1,613,343 A | 1/1927 | Clark | | |
| 1,863,454 A | 6/1932 | Rowley | | |
| 2,187,906 A | 1/1940 | Lowe | 169/17 |
| 2,695,609 A | 11/1954 | Nourse et al. | 128/142 |
| 2,731,091 A | 1/1956 | Robbins | 169/17 |
| 2,822,052 A | 2/1958 | Herkimer | 169/19 |
| 3,165,115 A | 1/1965 | Erson | 137/494 |
| 3,476,353 A | 11/1969 | Stampfli | 251/45 |
| 3,589,445 A | 6/1971 | Juliano | 169/17 |
| 3,595,318 A | 7/1971 | Merdinyan | 169/17 |
| 3,727,878 A | 4/1973 | Willms | 251/57 |
| 3,785,440 A | 1/1974 | Shea | 169/20 |
| 3,788,400 A | 1/1974 | Tufts | 169/11 |
| 4,286,668 A | 9/1981 | McCormick | 169/22 |
| 4,570,719 A | 2/1986 | Wilk | 169/20 |
| 4,615,353 A | 10/1986 | McKee | 137/102 |

(List continued on next page.)

FOREIGN PATENT DOCUMENTS

| | | | |
|---|---|---|---|
| DE | 39 40 446 | 6/1990 | A47B/46/00 |
| FR | 2 334 032 | 7/1977 | F16K/17/36 |
| WO | WO 99/59678 | 11/1999 | A62C/37/06 |

OTHER PUBLICATIONS

U.S. application No. 10/060,441, filed Jan. 30, 2002, entitled Low Pressure Electro–Pneumatic and Gate Actuator (Reilly).

U.S. application No. 09/897,167, filed Jul. 2, 2001, entitled Low Pressure Pneumatic and Gate Actuator (Reilly).

*Primary Examiner*—Michael Mar
*Assistant Examiner*—Davis Hwu
(74) *Attorney, Agent, or Firm*—Synnestvedt & Lechner LLP

(57) ABSTRACT

Embodiments of a low-pressure actuator, for use in a dry, low-pressure, pressurized gas, liquid fire control and suppression sprinkler system, with a pneumatic/electric double interlock mechanism, which requires that two separate events, such as discharging air pressure from the sprinkler system, and an electrical detection, must occur in order for the sprinkler check valve to be activated, thereby allowing water into the sprinkler system, are disclosed. In certain embodiments, a low-pressure actuator is utilized in series with a liquid flow valve equipped with a solenoid and an electrical detector/sensor for detecting an event such as the occurrence of smoke, heat, or a high rate of temperature rise. In alternative embodiments, the low-pressure actuator itself is equipped with the solenoid and detector/sensor.

15 Claims, 6 Drawing Sheets

U.S. PATENT DOCUMENTS 4,854,342 A 8/1989 Polan .................... 137/516.29
4,991,548 A * 2/1991 Richeson et al. ........ 123/90.14
5,044,786 A 9/1991 Jacob et al. ................ 384/549
5,096,266 A 3/1992 Skantar ....................... 303/82
5,294,090 A 3/1994 Winnike ...................... 251/36
5,439,028 A 8/1995 Meyer et al. ............... 137/556
5,628,489 A * 5/1997 Woodman .................... 251/29
5,899,277 A 5/1999 Eisenbeiss et al. ........... 169/46
6,000,473 A 12/1999 Reilly ......................... 169/17
6,029,749 A 2/2000 Reilly et al. .................. 169/17
6,068,057 A 5/2000 Beukema ..................... 169/22
6,138,766 A 10/2000 Finnerty et al. .............. 169/14
6,158,520 A 12/2000 Reilly et al. .................. 169/17
6,293,348 B1 9/2001 Reilly ......................... 169/16
6,378,616 B2 4/2002 Reilly ......................... 169/17

* cited by examiner

LOW PRESSURE ACTUATOR FOR DRY SPRINKLER SYSTEM

CROSS REFERENCE TO RELATED APPLICATIONS

This is a Continuation-In-Part of U.S. patent application Ser. No. 09/535,599, filed Mar. 27, 2000 now U.S. Pat. No. 6,293,348.

FIELD OF THE INVENTION

The present invention relates to a low-pressure actuator for use in a dry, pressurized-air, fire control and suppression sprinkler system, that typically uses water as the extinguant or extinguishing liquid. The low-pressure actuator of the present invention is applicable for use in a dry type fire control and suppression sprinkler system, in which the piping between the pressurized extinguishing water source and individual sprinkler heads is normally void of water. The low-pressure actuator of the present invention is particularly applicable to low-pressure dry type sprinkler systems, wherein the system gas (typically air) pressure is not greater than about 20 psi.

BACKGROUND OF THE INVENTION

Fire control and suppression sprinkler systems generally include a plurality of individual sprinkler heads, which are usually ceiling mounted about the area to be protected. The sprinkler heads are normally maintained in a closed condition and include a thermally responsive sensing member to determine when a fire condition has occurred. Upon actuation of the thermally responsive member, the sprinkler head is opened, permitting pressurized water at each of the individual sprinkler heads to freely flow therethrough for extinguishing the fire. The individual sprinkler heads are spaced apart from each other, by distances determined by the type of protection they are intended to provide (e.g. light or ordinary hazard conditions) and the ratings of the individual sprinklers, as determined by industry accepted rating agencies such as Underwriters Laboratories, Inc., Factory Mutual Research Corp. and/or the National Fire Protection Association. It should be well appreciated that once the sprinkler heads have been thermally activated there should be minimal delay for the water flow through the sprinkler head at its maximum intended volume.

In order to minimize the delay between thermal actuation and proper dispensing of water by the sprinkler head, the piping that connects the sprinkler heads to the water source is, in many instances at all times filled with water. This is known as a wet system, with the water being immediately available at the sprinkler head upon its thermal actuation. However, there are many situations in which the sprinkler system is installed in an unheated area, such as warehouses. In those situations, if a wet system is used, and in particular since the water is not flowing within the piping system over long periods of time, there is a danger of the water within the pipes freezing. This will not only deleteriously affect the operation of the sprinkler system, should the sprinkler heads be thermally actuated while there may be ice blockage within the pipes, but such freezing, if extensive, can result in the bursting of the pipes, thereby destroying the sprinkler system. Accordingly, in those situations it is the conventional practice to have the piping devoid of any water during its non-activated condition. This is known as a dry fire protection system.

All fire protection sprinkler systems generally include a check valve for isolating the sprinkler system piping from the pressurized water source during the non-activated condition. The check valve, which is physically interposed between the system piping and the pressurized water source, includes a clapper, which when it is in its closed operative condition prevents the flow of pressurized water into the sprinkler system piping. The sprinkler piping in the dry fire protection system includes air or some other inert gas (e.g. nitrogen) under pressure. The pressurized air, which is present within the sprinkler system piping, is also presented to the check valve. Should one or more of the sprinkler heads be thermally activated to its open condition, the pressure of the air within the sprinkler system piping and check valve will then drop. The check valve must be appropriately responsive to this drop in pressure, normally in opposition to the system water pressure also present in the check valve, to move the clapper to its open condition. When this occurs, it is desirable to have a rapid expulsion of the pressurized air within the check valve and the sprinkler system piping, to permit the rapid flow of the pressurized water through the open check valve, into the sprinkler system piping, and through the individual sprinkler heads to rapidly extinguish the fire.

The check valves intended for dry type fire control sprinkler systems have typically controlled the clapper movement by the water and the air pressure applied to its opposite sides. Such fire check valves include an air seal, which opposes the pressurized water seal. To appropriately apply the system air pressure over the surface of the clapper air seal, a priming water level is oftentimes maintained within the check valve. During normal conditions, when no sprinkler heads have been activated, the two seals will be at equilibrium, thereby maintaining the clapper in its closed condition.

In order to increase the speed of check valve operation upon a drop off of the system air pressure, occasioned by the activation of one or more sprinkler heads, the system air pressure is normally applied to the clapper air seal over a substantially greater area than the water pressure is applied to the clapper water seal. This is known as a high-differential-type check valve. A problem of such valves is that should there be a reduction in the system water pressure after the clapper has opened, there is a tendency for the clapper to reclose, particularly since the pressure against the opposite (air) side of the clapper has thereby been increased due to the column of water that has flowed therethrough. Since the pressure applied against the air seal of the clapper will now be increased by the column of water extending upwards from the re-closed check valve, a greater water pressure would now be required to move the clapper to its open condition. Such disadvantageous re-closure is referred to as a water columning effect. This could result in failure of the check valve to subsequently open should one or more of the sprinkler heads be thermally activated.

In order to avoid the re-closure of the clapper, dry system check valves have generally been provided with a mechanical latch to maintain the clapper in its open condition once it has been activated. The inclusion of such a mechanical latch, while serving to prevent re-closure, however, disadvantageously requires the entire sprinkler system to be shut down and the interior of the high differential type actuator accessed to release the latch and re-close the clapper after the fire has been extinguished. Thus, check valves have typically required the main supply of water to be shut off, the water drained from the system, and then the high differential check valve opened to manually unlatch and reset the clapper. Recognizing the disadvantage of having to manually access the interior of the check valve, a mechanism is shown in U.S. Pat. Nos. 5,295,503 and 5,439,028, which include a reset linkage mechanism that is attached to the check valve, and is actuated by the rotation of an externally accessible handle. As can be well appreciated such a mechanism adds to the size, cost and complexity of the check valve.

Another way by which the response of a system check valve can be made faster upon activation is to incorporate a low-pressure actuator into the system. Actuator-accelerators for fire control and suppression sprinkler systems, including the low-pressure actuator of the present invention, are pilot valves that are designed to actuate the check valve. Actuators for dry fire protection systems, including the low pressure actuator of the present invention, detect a decline in system pressure due to a triggering event, such as the opening of a sprinkler head, and cause the valve to operate in order that water or another extinguishing liquid utilized in the system can flow into and fill the system as rapidly as possible so as to minimize the time it takes for the water to reach and be distributed to the multiple individual sprinkler heads of the system and be applied to extinguish a fire.

Traditionally, dry pipe valves used in sprinkler systems employ pressurized air in order to keep water from entering the sprinkler system. Although this pressurized air is given a mechanical advantage over the water pressure, typically of from about 5–8:1, typical air pressures in dry sprinkler systems are from 30 psi to 50 psi. Displacement of this volume of air from the piping of the sprinkler system will delay the operation of the sprinkler control valve, as well as slow the rate of water entry into the sprinkler system once the control valve is actuated.

For example, given a supply water pressure of 80 psi and a sprinkler control with an 8 to 1 water to air ratio, and given that a sprinkler head activates when the system air pressure is at 30 psi, the air pressure must decay from 30 to 10 psi before the valve will activate. Also, once the valve activates, the remaining 10 psi of air pressure must still be exhausted before the water can completely fill the sprinkler system.

In the case of using an actuator-accelerator, given a supply water pressure of 80 psi, if a head activates when the system air pressure is at 30 psi, the accelerator will activate on a rapid pressure drop of less than 5 psi. Although this will greatly reduce the time required for the valve to operate, the remaining 25 psi air pressure must still be exhausted before the sprinkler system becomes filled with water.

It is, therefore, advantageous to have as little air as possible in the system, in order to obtain the most rapid delivery of water to the sprinkler heads of a dry sprinkler system.

In the fire protection industry there also exists a specialized class of sprinkler control valves, which provides added security against the accidental discharge of water into or from the sprinkler system. These systems are known as pneumatic/electric double interlock systems. Such systems are frequently used in refrigerated spaces. These systems contain air pressure in the sprinkler system in order to prevent either accidental discharge of water or the freezing of any water in the sprinkler-piping network.

In order to provide this added security, these systems require that two separate events must occur in order for the sprinkler control valve to activate and allow water into the sprinkler system. In the preferred embodiment these two events consist of a sprinkler head activating, thus discharging air pressure from the sprinkler system, and an electrical detection. The electrical detection can be from any number of devices, such as, but not limited to, smoke, heat and rate of temperature rise detectors. There is also a need in the art for a low-pressure actuator for use in conjunction with such a system.

SUMMARY OF THE INVENTION

As used herein, the terms gas and air are used substantially interchangeably to refer to the non-liquid fluid utilized in the apparatus and system, where air is the gas most typically used; and the terms liquid and water are used substantially interchangeably to refer to the liquid fluid utilized in the apparatus and system, where water is the liquid most typically used.

The low pressure actuator of the present invention is designed to rapidly reduce the water pressure that is applied to the check valve plunger upon the occurrence of an air pressure drop occasioned by the thermally responsive opening of one or more of the sprinkler heads.

More specifically, the present invention provides a low-pressure actuator for a check valve, having particular utilization in conjunction with a dry fire control sprinkler system in which the system piping is normally devoid of water, and includes pressurized air (or other inert gas).

It is desirable to operate such systems at as low a system gas pressure as possible to minimize the time required for gas pressure to fall when the system is actuated, and thereby minimize the time to clear the system piping and lines of air so that an extinguishing liquid can be delivered to the sprinkler heads as rapidly as possible. The low-pressure actuator of the present invention is designed to operate in systems where the system gas or air pressure is not greater than about 20 psi, and is preferably about 10 psi, or even lower.

Typically water is used as the fire extinguishing fluid, although other liquids can be used, including fire suppressing and retarding chemicals, either alone, or added to water to form a solution.

The low-pressure actuator comprises a housing, which has an outlet at one end, which is connected to the pressurized air of the fire control sprinkler system. The opposite end of the low-pressure actuator has an inlet, which is connected, to the source of pressurized water. A plurality of chambers is provided between the water inlet and air outlet, with a system of air and water pressure-sensitive diaphragms. The low pressure actuator will have a closed operative condition during which time it isolates the check valve, and hence the sprinkler system piping, from the pressurized water source, and an open operative condition in which it allows the pressurized water to freely flow through itself and the check valve and into the sprinkler system piping. A seal is provided which includes cooperating flexible pressure seals, of minimal differential area. The pressurized air is applied against one of the seals, and pressurized water against the other seal. The diaphragm system includes an upper, air pressure-sensitive diaphragm and a lower, water pressure-sensitive diaphragm. The low-pressure actuator includes a tripping device for establishing air pressure in the unit.

The air pressure seal has a substantially greater area than the water pressure seal. The ratio of the water pressure seal area to the air pressure seal area is greater than about 20:1 and may be as high as about 600:1, or higher. When the pressure being applied over the areas of the air and water pressure seals are in equilibrium, these seals will be in a first operative condition. When a predetermined pressure has been reached in the first chamber, the tripping device operates, causing air in the first chamber to be exhausted to atmosphere. The air pressure seal will then no longer be in equilibrium with the water pressure seal. That seal will then be flexed towards the first chamber and move to a second operative condition. When this occurs, the seal between the inlet and outlet openings of the water chamber will open, no longer blocking the communication between the inlet and outlet openings. This will then allow the system water pressure from the line in common with the check valve plunger to drain. The check valve is then rapidly operated to its open condition.

The tripping device is used to pressurize the low-pressure actuator. The tripping device has a spring which is biased to maintain the tripping device in a closed position when the low pressure actuator and the tripping device itself are pressurized at the system pressure. The tripping device has an air pressure seal to spring-constant force ratio. When the gas pressure in the gas compartment falls due to a fall in system gas pressure, caused by an opening in the system, such as caused by an actuated sprinkler head, the spring force will exceed the counter-balancing force due to gas pressure in the gas compartment, at some level, causing the spring to open the outlet of the tripping device and causing the remaining air therein to flow out, further lowering the gas pressure in the actuator, thereby causing it to become actuated and water to flow through the actuator to the check valve, which is opened, thereby also releasing water to the sprinkler heads. Thus, the low-pressure actuator can be set to respond when the system gas pressure falls to a predetermined value, by providing a spring for the tripping device having a particular spring constant and an air pressure to spring force ratio that will cause the tripping device to open when the predetermined lower gas pressure value is reached. By selecting a spring with a lower spring constant, the tripping device will not open until a lower system gas pressure is reached; and by selecting a spring with a higher spring constant, the tripping device will be caused to already open when there has been only a relatively small drop in system gas pressure.

Modified embodiments of the low pressure actuator according to the present invention include those which can provide even more rapid operation in response to a drop in the system air pressure, occasioned by the opening of one or more sprinkler heads. A particularly preferred embodiment of low pressure actuator according to the present invention incorporates a three-chamber housing, has a dual diaphragm based system, where a first diaphragm provides a gas-liquid seal, and a second diaphragm provides a water-dry seal when the low pressure actuator is in the closed condition and is open to liquid contact on both sides when the low pressure actuator is in an actuated, open condition. This embodiment typically operates at a system gas pressure of about 10 psi, but is capable of operating at even lower pressures.

The system pressurizing gas is applied to the first diaphragm in the first chamber. Pressurized system extinguishing liquid flows into the third chamber.

A restrictor is provided between the liquid side of the upper diaphragm in the gas compartment and the liquid compartment. When a drop in the system air pressure occurs, the gas compartment will have a drop off of its internal air pressure, corresponding to the drop in system pressure. Actuation of the tripping device causes the upper diaphragm to be displaced by the greater liquid pressure on the wet side of the upper diaphragm, causing water to flow through a by-pass orifice which was previously sealed and is opened by the moved diaphragm, thereby causing liquid to flow through to the outlet. In turn, this causes the second diaphragm to be displaced and a greater liquid flow to the liquid outlet occurs.

It is, therefore, a primary object of the present invention to provide an improved low-pressure actuator, having particularly utilization in conjunction with dry fire control and suppression sprinkler systems.

Another object of the present invention is to provide a low-pressure actuator for use in dry fire control and suppression systems, wherein the low-pressure actuator has a single set point regardless of the system liquid pressure.

Still another object of the present invention is to provide a low pressure actuator for use in dry fire control and suppression systems, wherein the time for system gas pressure to vent and extinguishing liquid to flow to sprinkler heads of the system is greatly reduced.

An additional object of the present invention is to provide a low-pressure actuator for use in dry fire control and suppression systems, wherein the low-pressure actuator is responsive to a decline in system gas pressure.

Yet another additional object of the present invention is to provide a low-pressure actuator for use in dry fire control and suppression systems utilizing a low-differential check valve.

A still further additional object of the present invention is to provide a low pressure actuator for use in dry fire control and suppression systems, wherein a low system gas pressure is advantageously utilized to maintain the low pressure actuator in a closed position in opposition to a substantially higher extinguishing liquid pressure.

Yet another additional object of the present invention is to provide a low-pressure actuator, which provides a fast response to the check valve and prevents air and water buildup in the low-pressure actuator.

Still an additional object of the present invention is to provide a low-pressure actuator that operates at low system gas pressure so as to enable the use of a smaller gas compressor as part of the system.

One further object of the present invention is to provide a low-pressure actuator with a pneumatic/electrical double interlock safety feature, for use in certain applications, such as for use in a dry sprinkler system for a refrigerated space.

These as well as other objects of the present invention will become apparent upon a consideration of the following detailed description and drawings.

DETAILED DESCRIPTION OF PREFERRED EMBODIMENTS OF THE INVENTION

Generally, a low pressure actuator according to the present invention, for use in a dry, low-pressure, pressurized-gas, fire control and suppression sprinkler system for delivering an extinguishing liquid to a fire, wherein there is a system gas pressure of up to about 20 psi and an extinguishing liquid supply pressure of up to about 300 psi, is actuated by allowing liquid to flow through the low pressure actuator to a sprinkler check valve, when the system gas pressure falls to a predetermined set point regardless of the system water pressure, to, in turn, actuate the sprinkler check valve to provide liquid flow for distribution through a piping system to a plurality of interconnected sprinklers.

Generally, all embodiments of the low pressure actuator according to the present invention include a housing having a gas compartment and a liquid compartment therein, each of the gas and liquid compartments having an inlet and an outlet for the respective inflow and outflow of a pressurized gas and a pressurized fire extinguishing liquid. All low-pressure actuators also include means for initially pressurizing the gas compartment. All low pressure actuators according to the present invention further have a first diaphragm, acting as a gas-liquid barrier, the first diaphragm being flexible and moveable, and having a surface area, such that a first, gas-side of the diaphragm is in fluid communication with gas in the gas compartment and a second, liquid-side of the diaphragm is in fluid communication with the liquid; and a second diaphragm, acting as a water flow barrier, the second diaphragm being flexible and moveable, and having a surface area, such that when the low pressure actuator is in a closed, ready-condition, a first side of the second diaphragm is in a wet state, in fluid communication with the liquid, and a second side of the second diaphragm is in a dry state, in communication with the liquid outlet; and when the low pressure actuator is in an actuated condition, both sides of the second diaphragm are in a wet state, in fluid communication with the liquid. There is a connecting passage between the liquid side of the first diaphragm and the liquid compartment such that when gas pressure in the sprinkler system in which the low-pressure actuator is placed drops below a pre-determined set point, after an initial pressurization of the sprinkler system and the low-pressure actuator, to a pressure above the set point, a pressure equilibrium on the first diaphragm is upset causing the first diaphragm to move and allow a priming flow of liquid to the liquid outlet through a liquid by-pass, which is otherwise sealed when the first diaphragm is in a gas-liquid pressure equilibrium condition, thereby also simultaneously causing the second diaphragm to move and allow a greater flow of liquid to provide the main extinguishing liquid through to the liquid outlet.

Figure 1:
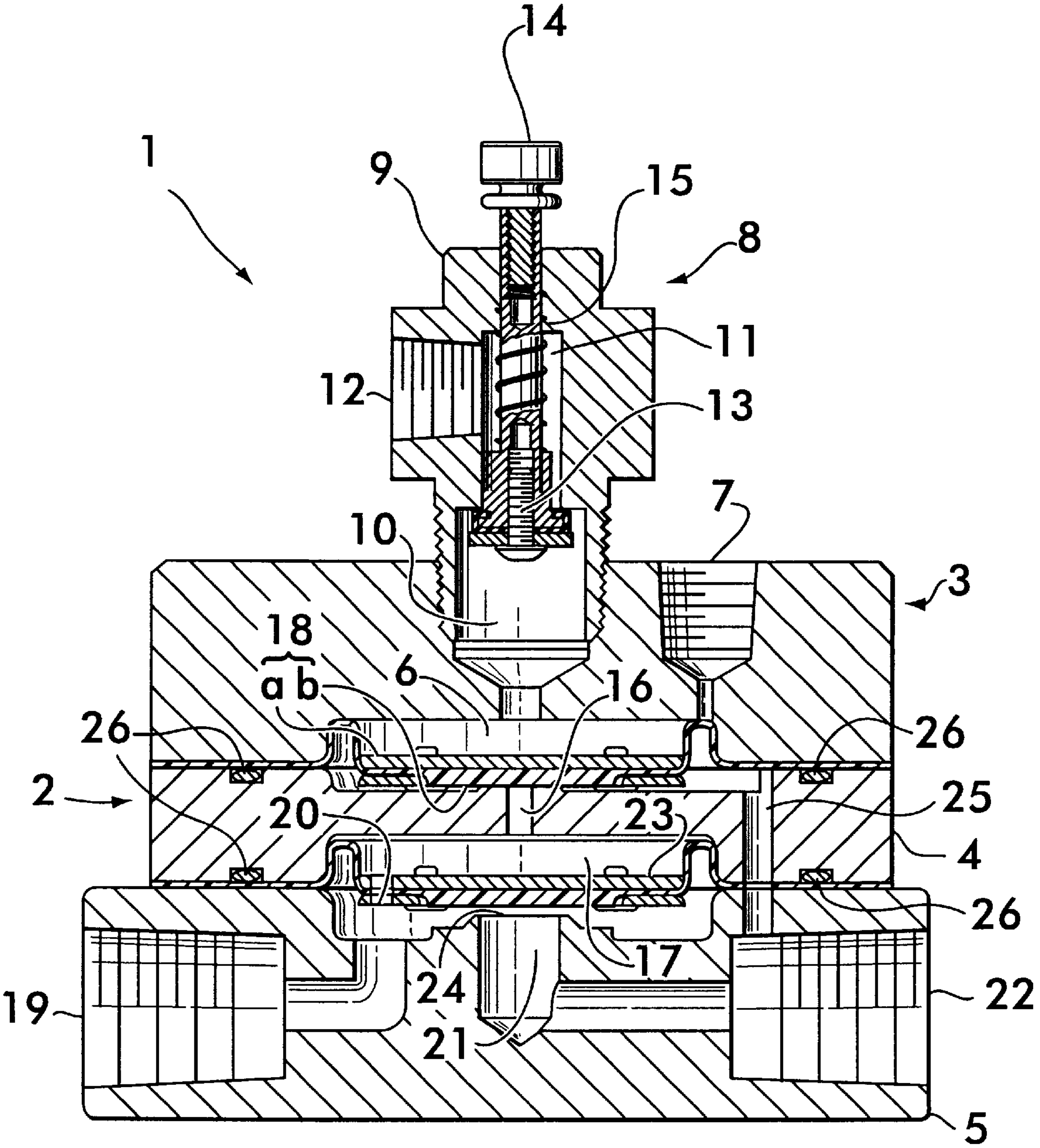
FIG. 1 is a cross-sectional view of a preferred embodiment of a low-pressure actuator for a dry sprinkler system according to the present invention, shown in initialization mode.

Referring now initially to FIG. 1, a particularly preferred embodiment of a low pressure actuator of the present invention for use in a dry sprinkler system, such as is made and sold by Victaulic Fire Safety Company LLC, Easton, Pa., USA, as, for example, the Series 776 Ultimator, is installed in interposition between an upstream extinguishing liquid, usually water, source, and a downstream check valve, which leads to the piping and a plurality of individual sprinkler heads. The system and low pressure actuator is first readied for operation by placing the low-pressure actuator in a stand-by condition. The low-pressure actuator 1 is initialized by first simultaneously introducing a gas, usually air, into the sprinkler system piping and the low-pressure actuator 1 itself.

The low pressure actuator 1 includes a housing 2, which has a vertical axis, and itself includes three chambers, namely, an upper chamber 3, a middle chamber 4, and a lower chamber 5, spaced along the vertical axis. The housing is constructed of a high strength metallic material, which may be ductile iron. However, it should be understood that other materials and processes of manufacture could be used. For instance the housing 2 could be constructed of machined stainless steel or suitably molded plastic or other materials having the requisite strength.

The upper and middle chambers are in communication with each other, as are the middle and lower chambers. The communication between the adjacent chambers can be made fluid-tight by the provision of at least one O-ring at the juncture of respective side ends of each adjacent pair of chambers.

Figure 5:
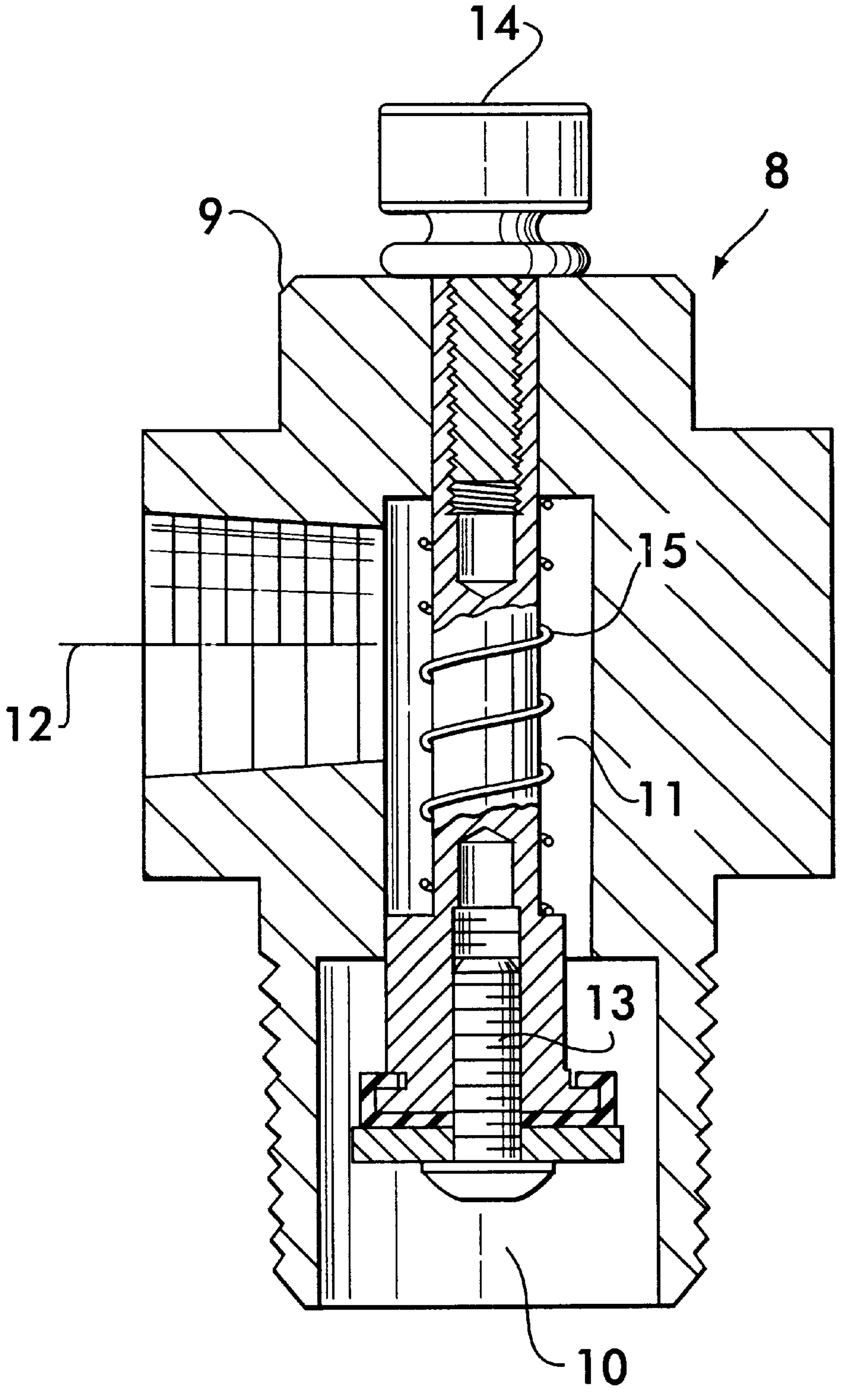
FIG. 5 is a cross-sectional view of a preferred embodiment of a tripping device for a low pressure actuator for a dry sprinkler system according to the present invention, shown as in fully actuated low-pressure actuator mode.

Referring to FIG. 5, a tripping device 8, such as an autodrain, as is manufactured and sold by Victaulic Company of America, Easton, Pa., is used to establish and regulate air pressure in the low-pressure actuator. The tripping device 8 is in communication with the upper chamber 3, and includes a tripping device housing 9 containing a tripping device gas compartment 10, which is in fluid communication with the gas compartment 6 of the upper chamber 3. The tripping device housing 9 further has a gas passageway 11 extending therethrough, leading from the the tripping device gas compartment 10 to the tripping device gas outlet orifice 12. A tripping device gas piston 13 is positioned in the tripping device gas passageway 11. The gas piston 13 is alternatively slideable between a closed position, wherein a gas-pressurized condition is established in the tripping device gas compartment 10 and the interior gas compartment 6 of the upper chamber 3, with the gas piston 13 forming a fluid-tight seal between the tripping device gas compartment 10 and the tripping device gas outlet orifice 12; and an open position, wherein gas pressure in the gas compartment 6 of the upper chamber 3 and the tripping device gas compartment 10 is relieved and gas is allowed to flow out from the gas compartment 6 and the tripping device gas compartment 10, through the passageway 11, and out through the gas outlet orifice 12. A mechanical compression spring 15 surrounds the gas piston 13, such that when the gas piston 13 is in the closed position, the spring 15 is compressed and exerts a counter-force to a force caused by air pressure in the tripping device gas compartment 10. Tripping device actuation means 14, such as a knob, is provided for alternatively sliding the gas piston 13 between its closed and its open positions.

Referring again to FIG. 1, the tripping device 8 is first pressurized by pressurized air from an external source entering gas compartment 6 of upper chamber 3 through restricted gas inlet orifice 7. The tripping device has actuation means, such as actuation knob 14. The tripping device 8 is actuated, such as by pulling actuation knob 14 outward, thereby compressing tripping device compression spring 15, to establish a pressure condition in upper chamber gas compartment 6. Air pressure in gas compartment 6 of upper chamber 3 exerts pressure on upper diaphragm 18, sealing pressure release orifice 16. The upper diaphragm 18 has an upper, gas-side surface area **18*a*, facing the gas compartment 6, and a lower, liquid-side surface area 18*b*, facing the liquid side and the pressure release liquid flow orifice 16. The ratio of the area of the upper, gas-side surface 18*a* of the upper diaphragm 18 to the area of the pressure release liquid flow orifice 16** is typically greater than 60 to 1. By such an arrangement, 1 psi of air pressure is capable of sealing against a water pressure in excess of 60 psi.

Figure 2:
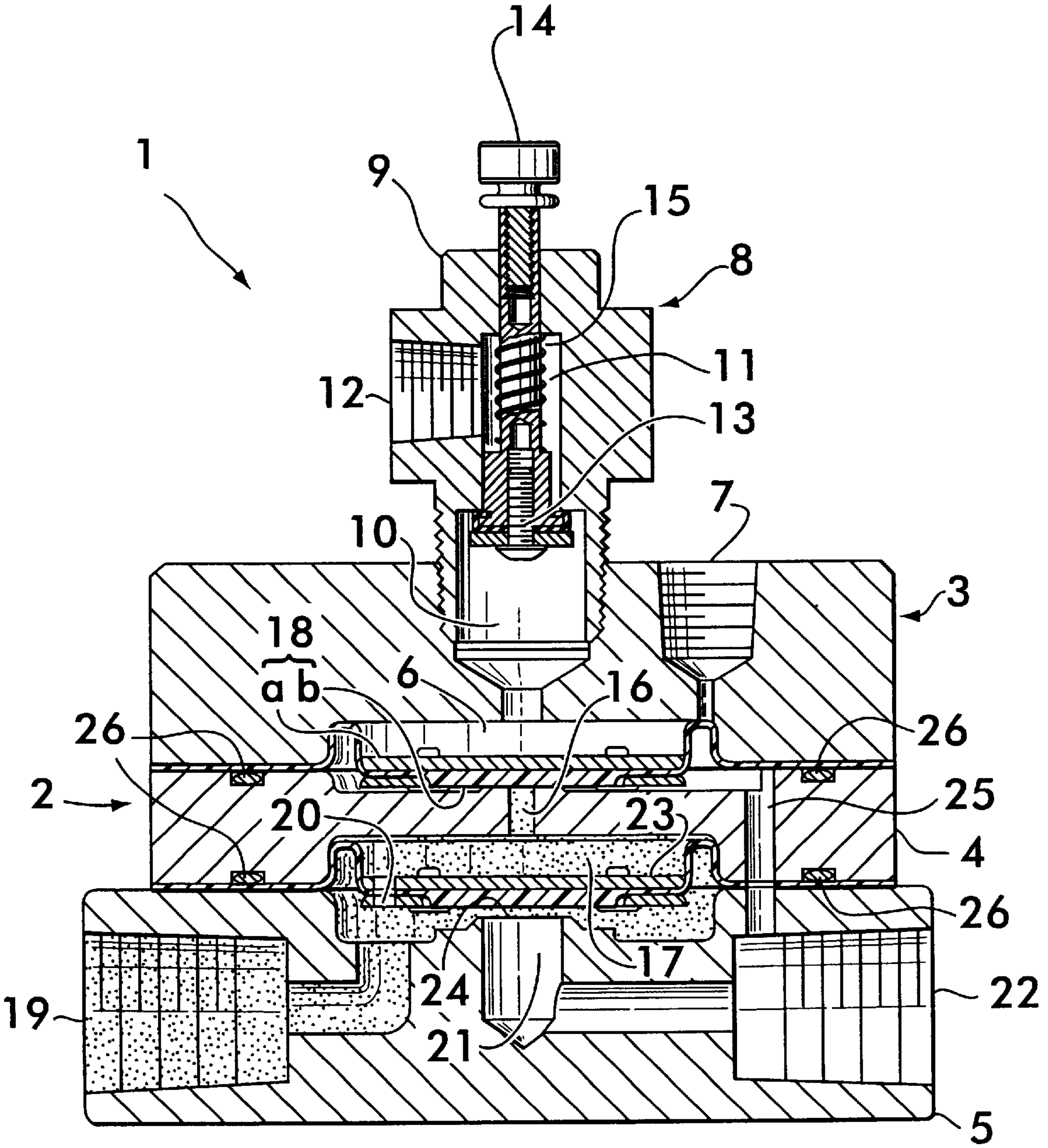
FIG. 2 is a cross-sectional view of a preferred embodiment of a low-pressure actuator for a dry sprinkler system according to the present invention, shown in ready mode.

Referring now to FIG. 2, once air pressure is established in the low-pressure actuator, on the air-side of the upper diaphragm 18*a*, and in the gas compartment 6, a pressurized fire-extinguishing liquid, typically water, is introduced into the low-pressure actuator from an external source. The low-pressure actuator has a channel therethrough for water flow. Water enters the low-pressure actuator through first liquid inlet orifice 19. From there, it flows through second liquid inlet orifice 20, and into liquid compartment 17 of middle chamber 4. As water fills liquid compartment 17, it pressurizes liquid compartment 17, causing lower diaphragm 23 to seal against a liquid sealing lip 24. Water is retained in the liquid compartment 17 by the air pressure established in gas compartment 6, and the differential area of the lower diaphragm 19 exposed to water. That is, the upper surface of diaphragm 23 has a greater area than the lower surface due to a reduction of the effective area caused by the smaller cross sectional area of first liquid outlet orifice 21.

Both the upper diaphragm 18 and the lower diaphragm 23 are fabricated from a flexible material, and are preferably formed of rubber.

Figure 3:
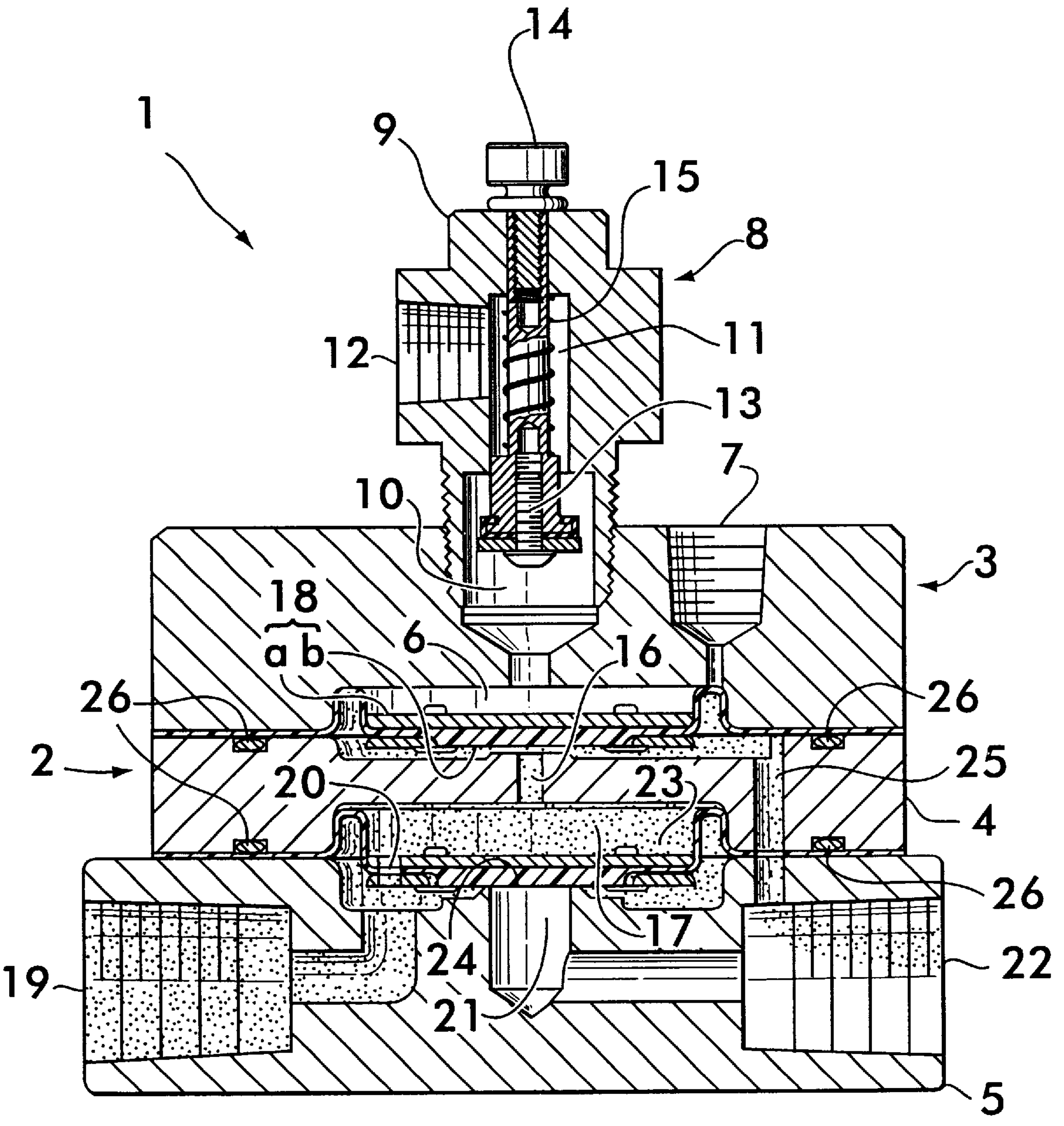
FIG. 3 is a cross-sectional view of a preferred embodiment of a low-pressure actuator for a dry sprinkler system according to the present invention, shown in triggered mode.

Referring now to FIG. 3, which shows low pressure actuator 1 during operation, when air pressure in the sprinkler system decays due to an open orifice, such as a sprinkler head that has been actuated or opened by a proximately sensed thermal event, such as a fire, air pressure in gas compartment 6 of the low pressure actuator will be reduced at the same decay rate as in the sprinkler system itself. When the air pressure in gas compartment 6 reaches a set point, such as about 5 psi, the force exerted by tripping device compression spring 15 in auto drain 8 will exceed the force exerted by the air on an air-tight seal formed auto-drain closure piston 13, causing the auto drain to open. This causes the remaining air pressure in gas compartment 6 to further decline. Restricted gas inlet orifice 7 in upper chamber 3 causes air to exit the auto drain air outlet 12 faster than it can enter gas compartment 6. Water pressure in liquid compartment 17 then causes upper diaphragm 18 to raise, causing water to flow through orifice first liquid outlet orifice 21 to liquid bypass orifice 25 and then to second liquid outlet orifice 22. Orifices 16, 22, and 25 are configured such that water will exhaust from liquid compartment 17 faster then it can flow through second liquid inlet orifice 16.

Figure 4:
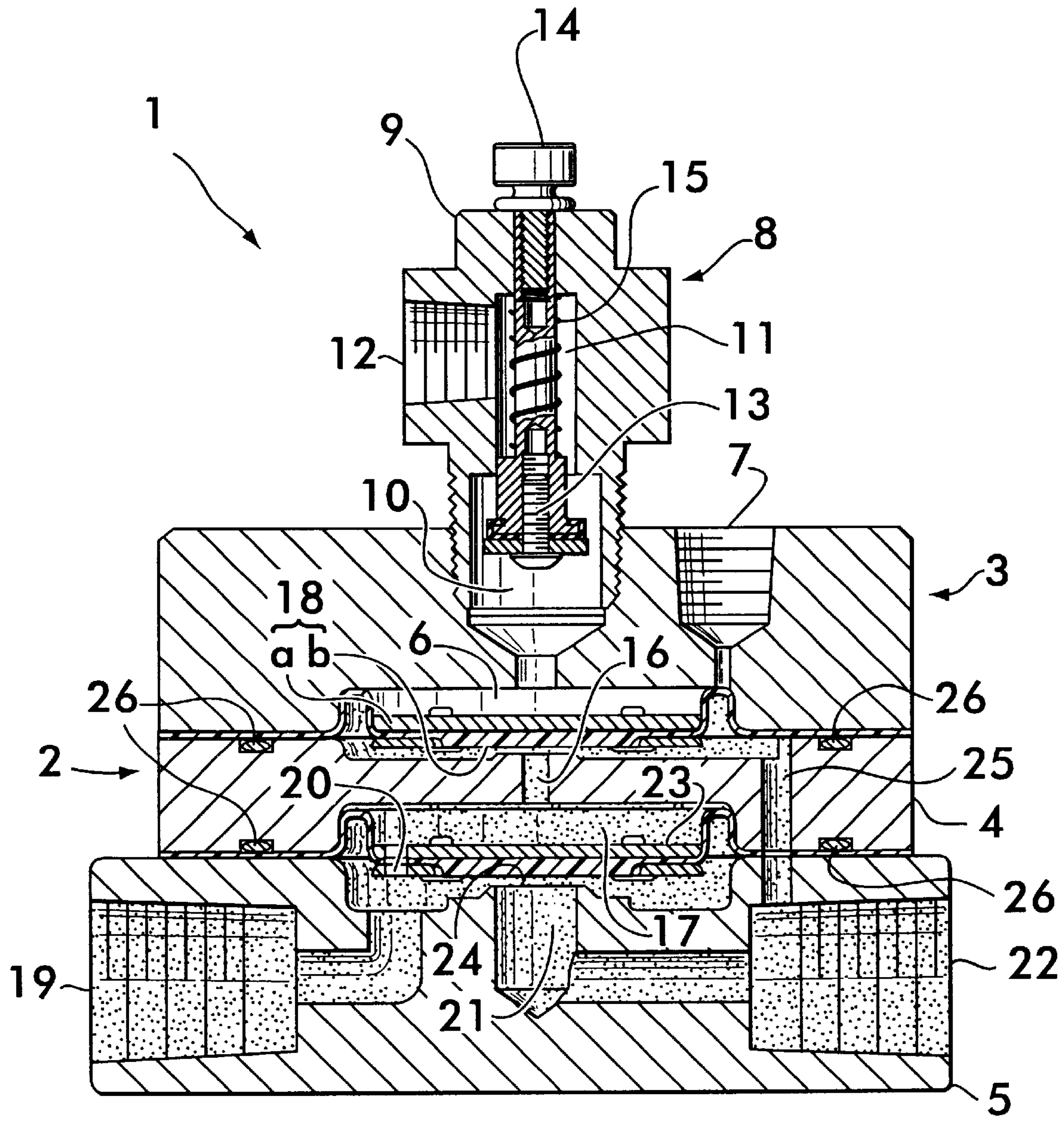
FIG. 4 is a cross-sectional view of a preferred embodiment of a low-pressure actuator for a dry sprinkler system according to the present invention, shown in fully actuated mode.

Referring now to FIG. 4, showing the low pressure actuator 1 in the final stage of actuation, the flow of water through liquid by-pass outlet orifice 21 causes lower diaphragm 23 to raise, releasing the water tight seal formed by the lower diaphragm 23 against liquid sealing lip 24 and allowing water to flow freely through the low pressure actuator and out second liquid outlet orifice 22 to a drain (not shown), at atmospheric pressure. This allows the piston in the check valve to release the sprinkler control valve clapper, actuating the sprinkler control valve and causing water to enter the sprinkler system and flow to the individual sprinkler heads.

Use of the low-pressure actuator of the present invention in a specific type of sprinkler system, known as a pneumatic/electrical double interlock system, which is often used for refrigerated sprinkler systems wherein the extinguishing liquid is maintained under refrigerated conditions, will now be discussed.

In order to provide the added security of a double interlock feature, these systems require that two separate events must occur in order for the sprinkler control valve to activate and allow water into the sprinkler system. In the preferred embodiment, these two events consist of a sprinkler head activating, thus discharging air pressure from the sprinkler system, and an electrical detection. The electrical detection can be from any number of devices, such as, but not limited to, smoke, heat and rate of temperature rise detectors.

One way on which the low-pressure actuator of the present invention, as described hereinabove, is utilizable in a pneumatic/electrical double interlock system, for use in a sprinkler system in a refrigerated space, is by using the low-pressure actuator, as described, in series (not shown) with a liquid flow valve equipped with an electric detection and actuation device, such as a solenoid, operating in conjunction with a sensor that functions based on the detection of a condition, such as smoke, heat, or a rate of temperature rise, to actuate the check valve. Such a liquid flow valve is commonly referred to as a solenoid valve.

In this situation, the low-pressure actuator is actuated in the normal way as described hereinabove, however, the electrical detector must also simultaneously be actuated in order for the check valve to open.

In such a device, the liquid flow valve (solenoid valve) and the low-pressure actuator are positioned in series with one another, arranged alternatively such that either device is upstream or downstream with respect to the other.

Alternatively, the electrical detection device is attached directly to the low-pressure actuator itself, so that the low-pressure actuator is actuated to open the check valve only upon the occurrence of both a pneumatic and an electrical actuation of the low-pressure actuator. In such a case, the low-pressure actuator must simultaneously be actuated by a drop in system pressure and by the detection by the electrical detector of some condition, which, depending on the type of sensor provided in the detector, can be a smoke condition, a heat condition, or a rate of temperature rise, all in excess of some predetermined threshold level. The sensor drives a solenoid connected to a shaft, which, in turn, actuates the low-pressure actuator. Only when the low-pressure actuator is actuated due to the simultaneous occurrence of both conditions, will it cause the check valve to open and release the extinguishing fluid into the system piping to the sprinkler heads.

In both of the above two situations, a double-interlock safety feature is provided. Wherever a solenoid is utilized, either on a separate solenoid valve in series with a low-pressure actuator, or attached to the low-pressure actuator itself, it is preferable that it be a UL FM-rated solenoid.

Figure 6:
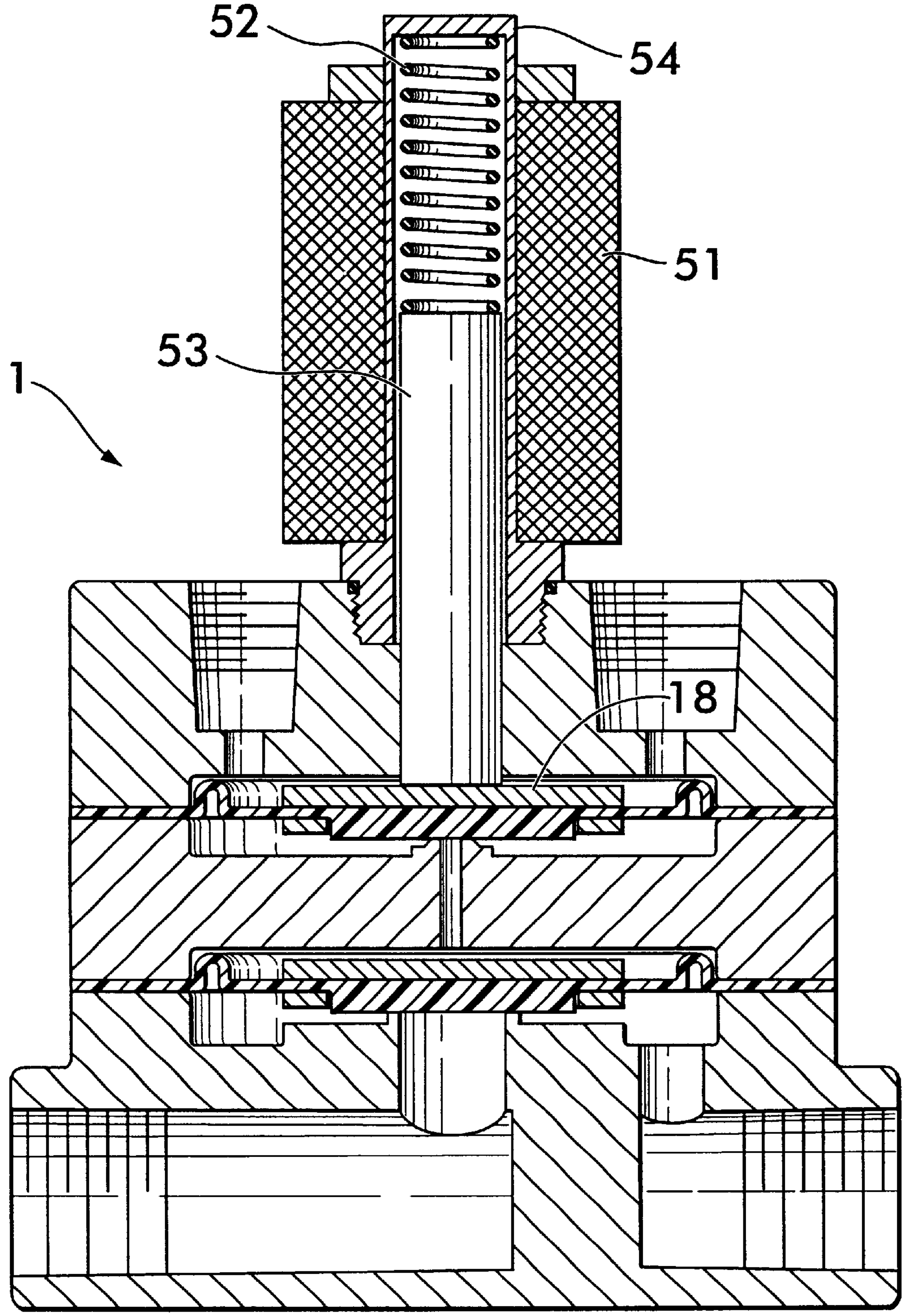
FIG. 6 is a cross-sectional view of a low-pressure actuator with a pneumatic/electric double interlock mechanism.

Referring now to FIG. 6, a low-pressure actuator for use in conjunction with a pneumatic/electric double interlock sprinkler system, such as is often used in a sprinkler system placed in a refrigerated area, is illustrated.

Typically, a double interlock system consists of a sprinkler control valve with an activating means attached to the check valve piston. This activating means is maintained in the closed position by the air pressure in the sprinkler system. The check valve piston maintains pressure on the sprinkler control valve clapper keeping the control valve closed until the pressure in the check valve piston is released, at which time the control valve clapper will open and water will flow into the sprinkler system. In fluid communication with the activating means is an electric solenoid. In this configuration if a sprinkler head is activated due either to fire or by mechanical damage, but there is no electric actuation of the solenoid, the pressure in the check valve piston is maintained by the shaft and the valve is prevented from activating. In the same manner, if there is an electric detection, but there is no sprinkler head activation the pressure in the activating device will maintain the check valve piston pressure. Thus, only when both the activating device opens, due to loss of system air pressure, and the solenoid opens, due to an electrical energization caused by detection of a condition by the smoke, heat, temperature rise, or other form of sensor, will the low-pressure actuator be mechanically actuated to cause the water pressure on the sprinkler check valve piston to be released to, in turn, allow the valve clapper open and allow water to flow into the sprinkler system.

According to a such an embodiment of a low-pressure actuator with a double-interlock safety mechanism forming an intrinsic part thereof, according to the present invention, a low-pressure actuator further includes a solenoid coil and shaft assembly in order to provide a pneumatic/electric double interlock feature on a single low-pressure actuator device.

FIG. 6 shows a solenoid assembly 50 consisting of coil 51, spring 52, shaft 53 and enclosure 54 attached to a low-pressure actuator according to the present invention, as previously described hereinabove.

As shown in FIG. 6, compression spring 52 exerts a closing force on upper diaphragm 18 of the low-pressure actuator. This force is of the same magnitude as the force exerted by 10 psi air pressure on upper diaphragm 18. When in its set position, upper diaphragm 18 has two closing forces exerted on it, the air pressure from the low-pressure actuator's normal operation and the force exerted by spring 52. Therefore, either one force is sufficient to maintain the low-pressure actuator in its closed condition.

Operationally, air pressure is provided to the low-pressure actuator through the sprinkler system piping as has been described previously hereinabove. When there is a discharge of air pressure from an open head the air pressure in the low-pressure actuator decreases until approximately 7 psi at which time the upper chamber of the low-pressure actuator is evacuated and the pressure decays to 0 psi. However, the low-pressure actuator will not open due to the closing force exerted by the solenoid on diaphragm 6. Similarly, if there is an electric detection solenoid 51 is energized which exerts a force on shaft 53, which is greater than the force exerted by compression spring 52, causing the shaft 53 to lift from upper diaphragm 18. In this case, the low-pressure actuator will not open due to the force exerted by the air pressure on upper diaphragm 18. In this manner, either closing force is sufficient to maintain the low-pressure actuator in its closed position. Only when both forces are removed due to an electric detection and an open sprinkler head, will upper diaphragm 23 open and allow the low-pressure actuator to open, thus venting the water from the check valve piston and allowing the sprinkler control valve to open and water to flow into the sprinkler system.

While the present invention has been disclosed with reference to specific embodiments and particulars thereof, many variations thereof will be apparent to those skilled in the art. Accordingly, it is intended that the scope of the invention be determined by the following claims.

What is claimed is:

1. An electro-pneumatic actuator for controlling a flow of a pressurized first fluid in response to a decrease in pressure of a pressurized second fluid and an electrical signal, said actuator comprising:

a first valve adapted to be in fluid communication with said first fluid, said first valve being openable by decreasing first fluid pressure within said first valve to allow flow of said first fluid therethrough, said first valve being normally closed;

a second valve being in fluid communication with said first valve, said second valve being openable to allow flow of a portion of said first fluid from said first valve thereby decreasing said first fluid pressure within and opening said first valve, said second valve being adapted to be in fluid communication with said second fluid and openable by said decreasing second fluid pressure within said second valve; and an electrical activating means engaging said second valve for normally maintaining said second valve in said closed position, said electrical activating means releasing said second valve in response to said electrical signal, said second valve opening in response to said electric signal and said decrease in pressure of said second fluid thereby decreasing said first fluid pressure in said first valve and allowing said first valve to open to allow flow of said first fluid through said outlet orifice.

2. An electro-pneumatic actuator according to claim 1, wherein said electrical activating means comprises a solenoid.

3. An electro-pneumatic actuator according to claim 2, wherein said first valve comprises:

a first chamber;

a first diaphragm dividing said first chamber into first and second chamber portions;

a first inlet orifice for providing fluid communication between said pressurized first fluid and said first chamber portion;

a second inlet orifice for providing fluid communication between said first and said second chamber portions;

a pressure release orifice in said first chamber providing fluid communication between said second chamber portion and said second valve; and an outlet orifice in fluid communication with said first chamber portion, said first diaphragm being deflectable by pressure within said second chamber portion into engagement with said outlet orifice thereby closing said first valve, said first diaphragm being deflectable out of engagement with said outlet orifice to open said first valve by a decrease in pressure in said second chamber portion.

4. An electro-pneumatic actuator according to claim 3, wherein said second valve comprises:

a second chamber;

a second diaphragm dividing said second chamber into third and fourth chamber portions, said third chamber portion being in fluid communication with said second chamber portion through said pressure release orifice;

a second inlet orifice providing fluid communication between said fourth chamber portion and said pressurized second fluid;

a bypass orifice providing fluid communication between said third chamber portion and said outlet orifice; and said second diaphragm being deflectable by pressure of said second fluid in said fourth chamber portion into engagement with said pressure release orifice to prevent flow of said first fluid from said second chamber portion and thereby maintain pressure therewithin, said solenoid engaging said second diaphragm and maintaining it in engagement with said pressure release orifice in the absence of said electrical signal, said second diaphragm being deflectable out of engagement with said pressure release orifice upon said decrease in pressure of said second fluid and said electrical signal actuating said solenoid to allow deflection of said second diaphragm thereby allowing said first fluid to flow from said second chamber portion into said third chamber portion, decreasing the pressure within said second chamber portion and thereby allowing said first diaphragm to deflect out of engagement with said outlet orifice to allow said first fluid to flow therethrough.

5. An electro-pneumatic actuator for actuating a system triggered by a flow of a pressurized first fluid, said electro-pneumatic actuator being in fluid communication with a source of pressurized second fluid and a source of electrical current, said electro-pneumatic actuator comprising:

a first pressure actuated valve controlling a flow of said pressurized first fluid through said actuator, said first valve having a first valve closing member with oppositely disposed sides both in fluid communication with said pressurized first fluid and being normally closed and preventing said flow, said first valve closing member opening to permit said flow when fluid pressure on one side of said first valve closing member exceeds fluid pressure on the opposite side of said first valve closing member, thereby actuating said system;

a second pressure actuated valve controlling the fluid pressure on said opposite side of said first valve closing member, said second pressure actuated valve having a second valve closing member movable from a closed position which maintains fluid pressure on said opposite side of said first valve closing member, to an open position which releases fluid pressure from said opposite side of said first valve closing member, said second valve closing member having a side in fluid communication with said source of pressurized second fluid and being movable from said closed to said open position in response to a decrease in pressure of said pressurized second fluid;

an electrically operated actuator engageable with said second valve closing member for maintaining it in said closed position, said electrically operated actuator adapted to respond to an electrical signal by releasing said second valve closing member from said closed position; and said second valve closing member moving into said open position only upon a concurrent pressure decrease of said second source of pressurized fluid and said electrical signal, thereby allowing said first valve closing member to move into said open position and permit flow of said pressurized fluid through said actuator, thereby triggering said system.

6. An electro-pneumatic actuator according to claim 5, wherein said first pressure actuated valve comprises a first chamber and said first valve closing member comprises a first diaphragm positioned within and sealingly dividing said first chamber into first and second chamber portions, said first chamber having a first inlet providing fluid communication between said pressurized first fluid and said first and second chamber portions, said first chamber portion having an outlet closable by said first diaphragm.

7. An electro-pneumatic actuator according to claim 6, wherein said second pressure actuated valve comprises a second chamber and said second valve closing member comprises a second diaphragm positioned within and sealingly dividing said second chamber into third and fourth chamber portions, said fourth chamber portion having an inlet for fluid communication with said source of pressurized second fluid, said third chamber portion having a pressure release orifice providing fluid communication with said second chamber portion, said pressure release orifice being closable by said second diaphragm moving into said closed position.

8. An electro-pneumatic actuator according to claim 7, wherein said electrically operated actuator comprises a solenoid.

9. An electro-pneumatic actuator according to claim 7, wherein the ratio of said area of said second diaphragm to said cross-sectional area of said pressure release orifice is between about 40/1 and about 600/1.

10. An electro-pneumatic actuator according to claim 5, wherein said system is a fire control and suppression sprinkler system comprising a plurality of sprinkler heads interconnected by a piping system.

11. An electro-pneumatic actuator for controlling a flow of a pressurized first fluid in response to a decrease in pressure of a pressurized second fluid and an electrical signal, said actuator comprising:

a first chamber having a first inlet orifice and an outlet orifice, said first chamber being in fluid communication with said first fluid through said first inlet orifice;

a first flexible diaphragm positioned in said first chamber and being deflectable into engagement with said outlet orifice thereby preventing flow of said first fluid therethrough, said first diaphragm being deflectable out of engagement with said outlet orifice upon a decrease in pressure within said first chamber to allow flow of said first fluid through said outlet orifice;

a second chamber;

a pressure release orifice providing fluid communication between said first and second chambers;

a second flexible diaphragm positioned within said second chamber and being deflectable into engagement with said pressure release orifice thereby preventing flow of said first fluid from said first chamber therethrough, said second diaphragm being deflectable out of engagement with said pressure release orifice to allow flow of said first fluid therethrough and thereby decrease pressure within said first chamber;

a second inlet orifice providing fluid communication between said second fluid and said second chamber, pressure from said second fluid maintaining said second diaphragm engaged with said pressure release orifice; and an electrical activating means engaging said second diaphragm for normally maintaining said second diaphragm engaged with said pressure release orifice, said electrical activating means releasing said second diaphragm in response to said electrical signal, said second diaphragm deflecting out of engagement with said pressure release orifice in response to said electric signal and said decrease in pressure of said second fluid thereby decreasing pressure in said second and said first chambers and allowing said first diaphragm to deflect out of engagement with said outlet orifice in response thereto, thereby allowing said first fluid to flow through said outlet orifice.

12. An electro-pneumatic actuator according to claim 11, wherein said electrical activating means comprises a solenoid having a shaft engaging said second diaphragm.

13. An electro-pneumatic actuator according to claim 11, wherein said pressurized first fluid comprises a liquid and said pressurized second fluid comprises a gas.

14. An electro-pneumatic actuator according to claim 11, wherein the area of said second diaphragm is larger than the cross-sectional area of said pressure release orifice so as to allow the fluid pressure necessary to maintain said second diaphragm in engagement with said pressure release orifice against fluid pressure within said first chamber to be established substantially independently of the pressure of said fluid in said first chamber.

15. An electro-pneumatic actuator according to claim 14, wherein the ratio of said area of said second diaphragm to said cross-sectional area of said pressure release aperture is between about 4/1 and about 600/1.

* * * * *